July 6, 1954
L. R. WOSIKA
2,682,925
AERODYNAMIC IMPROVEMENT IN FAN BLADES
Filed Jan. 19, 1950
4 Sheets-Sheet 1
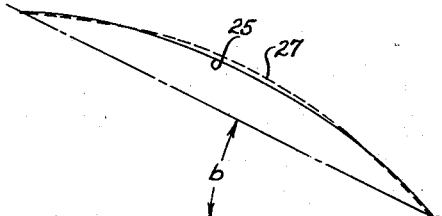
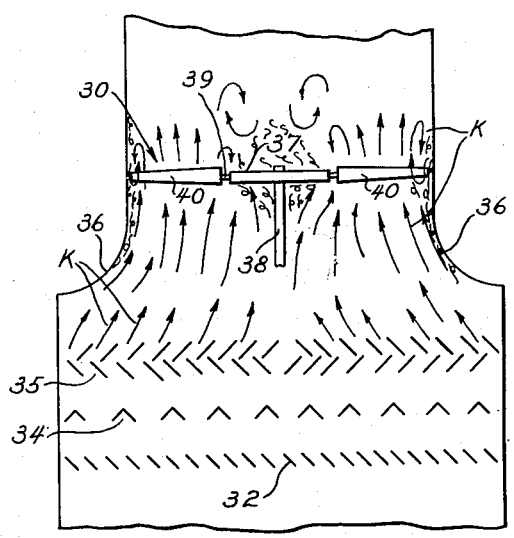
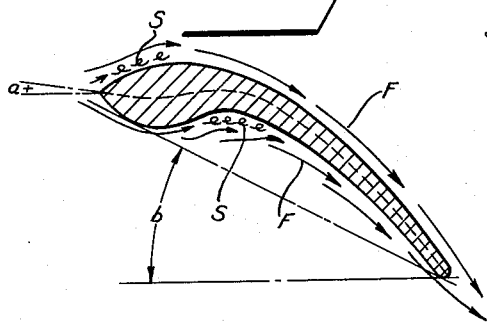
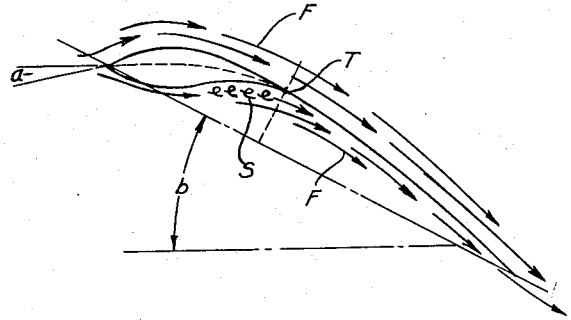
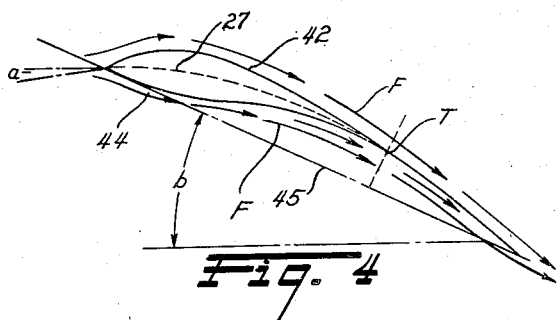
INVENTOR
Leon R. Wosika
By Strauch, Nolan & Diggins
Attorneys

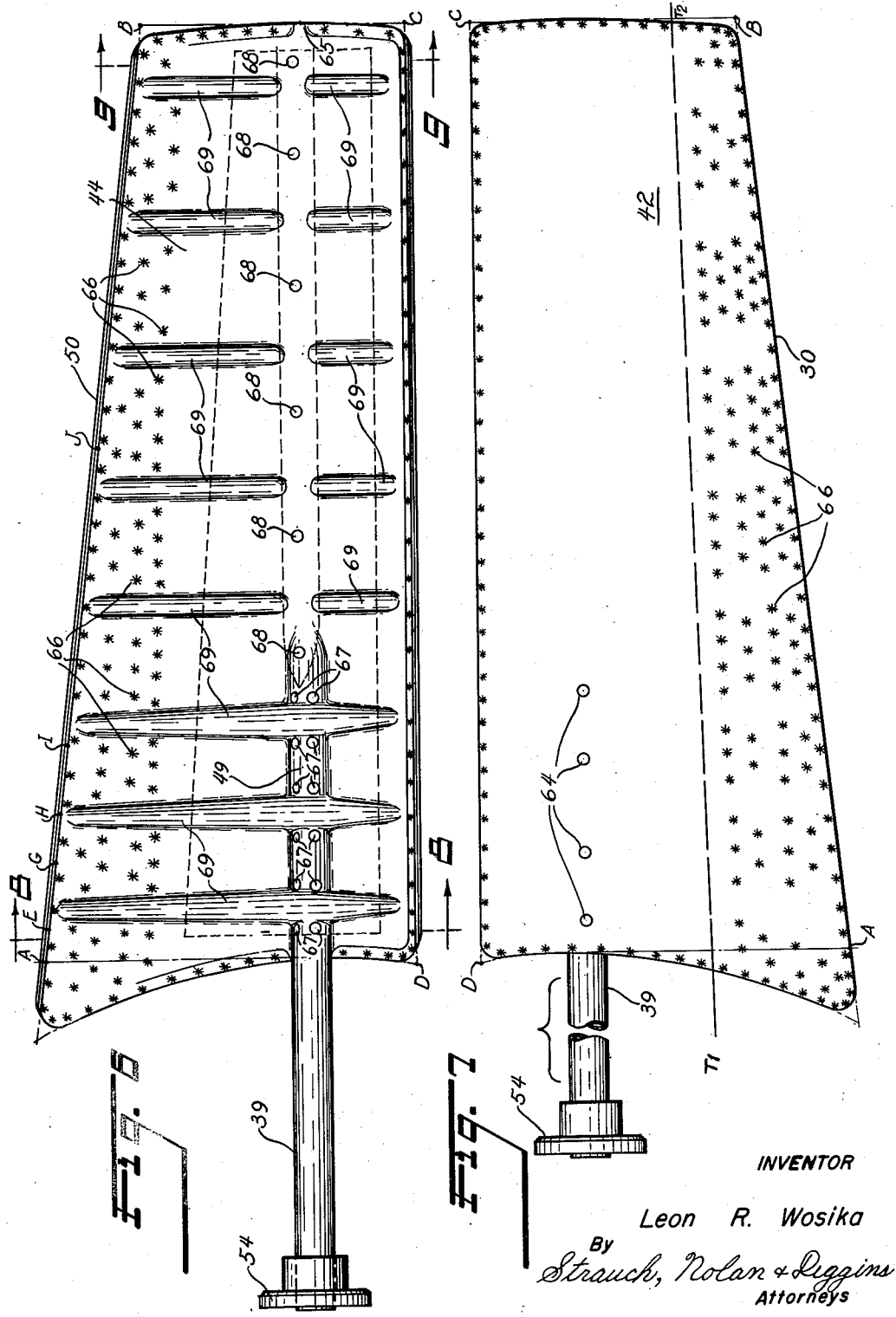

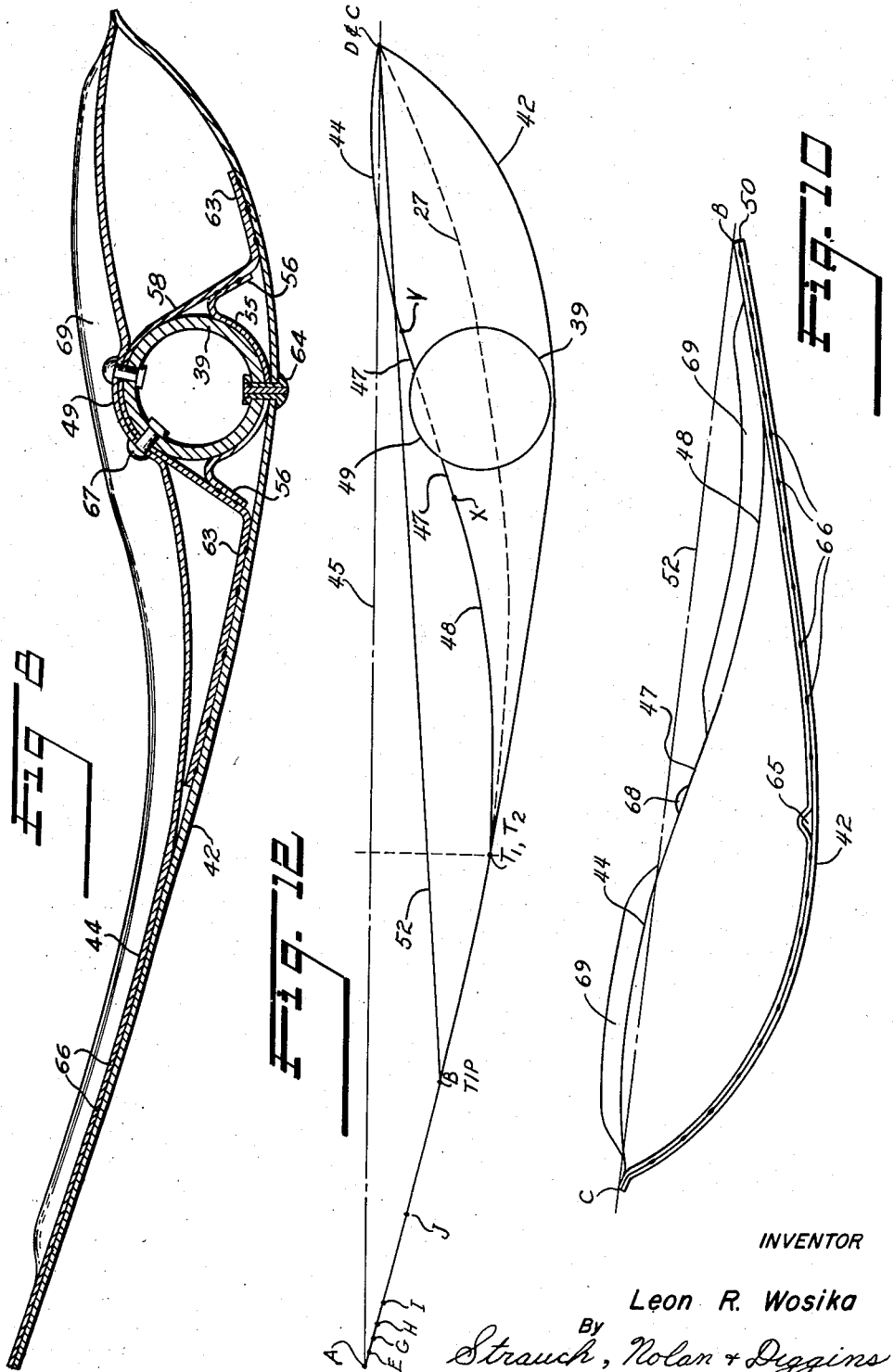

July 6, 1954     L. R. WOSIKA     2,682,925
AERODYNAMIC IMPROVEMENT IN FAN BLADES
Filed Jan. 19, 1950     4 Sheets-Sheet 4
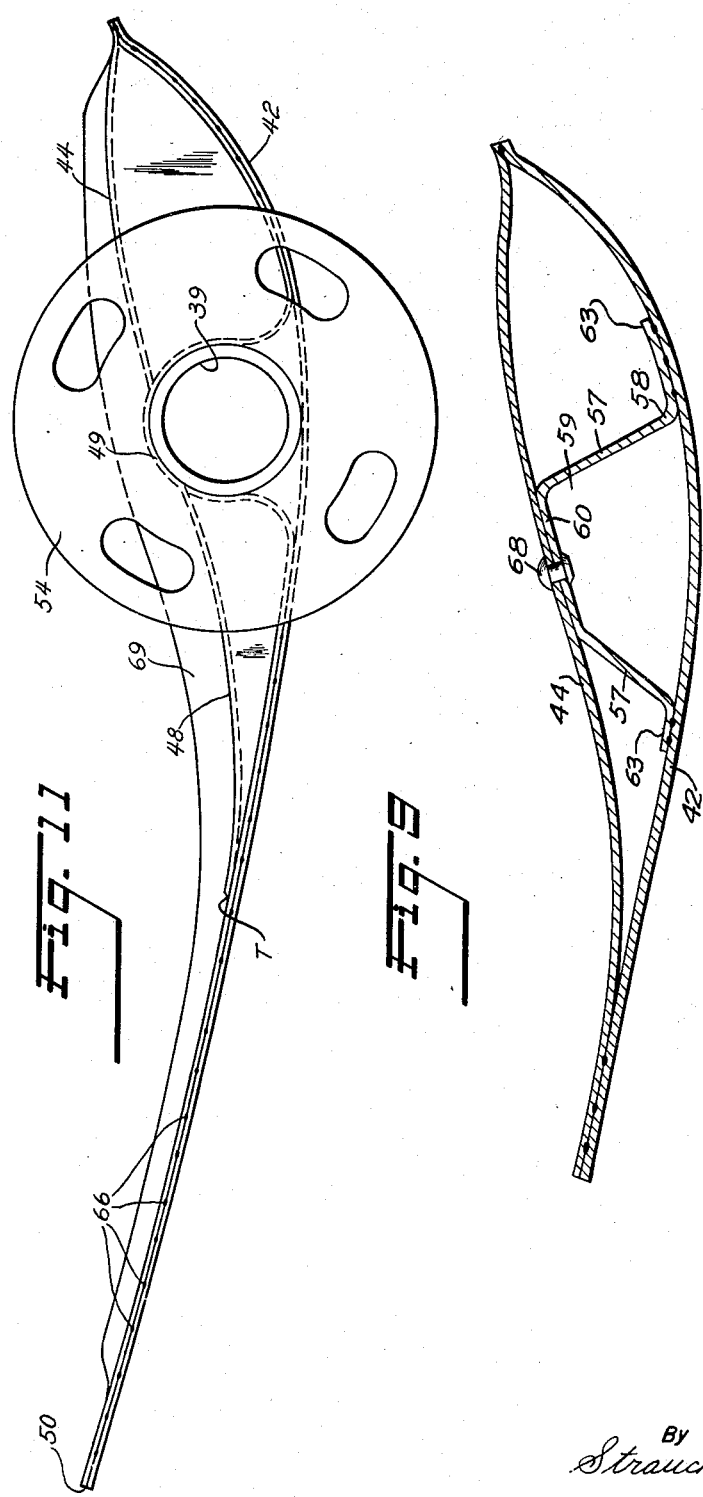
INVENTOR
Leon R. Wosika
By Strauch, Nolan & Diggins
Attorneys

Patented July 6, 1954

2,682,925

UNITED STATES PATENT OFFICE 2,682,925

AERODYNAMIC IMPROVEMENT IN FAN BLADES

Leon R. Wosika, San Diego, Calif., assignor to Solar Aircraft Company, San Diego, Calif., a corporation of California Application January 19, 1950, Serial No. 139,374

5 Claims. (Cl. 170—159)

My present invention relates to fan blade airfoils and is particularly adapted to fan blades for use in the tops of cooling towers such for example as are used in oil refineries and in other industries.

My invention solves long standing problems encountered in the design of fan blades for cooling towers which have not been solved by the numerous prior attempts to utilize the well-known aerodynamic principles of airfoils, propellers and axial flow fans in the design of cooling tower fans and which I have discovered require modifications in the blading if effective operation and high efficiency are to be gained.

For example, cooling tower design and economics will not permit use of effective ducting to aid in the efficiency of the fan. If it were feasible, a long radius curve entering the fan, a diffuser or diffuser guide vanes and hub streamlining would all combine to solve many of the special problems and increase the overall efficiency of the cooling tower. However, the cost of such an installation would far exceed the savings and benefits derived from the cooling tower. The conventional installation, therefore, does not have these devices.

To overcome these long standing problems, the present invention provides a novel fan blade that gives substantially improved air flow at a given cooling tower static pressure and power without use of stator vanes and a diffuser at the outlet side of the fan disc. My improved blade has a substantially uniform hollow profile throughout its length and, at the same time, gradually lessened angles of incidence towards the tip. The curvature of the upper convex surface of the blade provides for constant pressure distribution over the whole surface. The leading edge is rounded to overcome, except on some very small area at the division point, stalling that would be immediately present were a sharp edge presented to air meeting that edge at various angles. The lower surface is a gradually streamlined curve which merges with the upper surface at a point of tangency one-half to two-thirds of the blade width from the leading edge. This provides a hollow leading portion which is from one-half to two-thirds of the total blade width and because the curvature of the lower surface is slight the air can pass over this surface in a smooth unbroken flow and inefficient stalled areas are eliminated. This elimination of the stalled air areas which were present in the fan blades of the prior art is important since it is chiefly due to this elimination that greater efficiency at lower horsepower is obtained. The novel profile of this invention has also made it possible for the blade to contain the blade shaft with only a very minor disturbance of the continuous curve of the airfoil surface. The new blade as a whole combines high lift coefficient, effective aerodynamic lines and smoother discharge of air while maintaining a substantially uniform geometric profile and lessened angle of incidence toward the tip. All of these factors have made possible the raising of the design lift coefficient, an increase in fan efficiency from about 70% to 75% and greater efficiency in the cooling tower as a whole.

With these and other considerations in view, it is an important object of this invention to provide a cooling tower fan blade which will be highly efficient in the face of the adverse airflow conditions present in conventional cooling towers.

Another object resides in the provision of a cooling tower fan blade that will give the highest possible air flow at low horsepower where excessive cost prohibits the use of stator vanes and a diffuser in the tower.

A further object resides in the provision of an unwarped fan blade of substantially uniform profile having a decreasing angle of incidence towards the tip of the blade.

A still further object resides in the provision of a cooling tower fan blade in which a tangent to the mean camber line at the leading edge makes a negative angle with a plane normal to the axis of rotation of the blade.

Another object resides in the provision of a cooling tower fan blade having a streamlined cross section in which the hollow leading portion comprises from one-half to two-thirds the total blade width.

A further object resides in the provision of a fan blade having a nearly circular mean camber arc.

A still further object resides in the provision of a cooling tower fan blade having a high design lift coefficient and effective aerodynamic lines which tend to eliminate stalled air areas in operation.

Another object resides in the provision of a fan blade which is easily fabricated from stainless steel at a relatively low cost.

Other objects and advantages will be apparent from the following description in conjunction with the accompanying drawings and from the appended claims.

The accompanying drawings, in which like reference numerals are used to designate similar parts throughout, illustrate a preferred embodiment for the purpose of disclosing the invention. The drawings, however, are not to be taken in a limiting or restrictive sense since it will be apparent to those skilled in the art that various changes in the illustrated construction may be resorted to without in any way exceeding the scope of the invention.

In the drawings:

Figure 1 shows an NACA type "$a$" mean camber arc as a solid line with a mean camber arc of the blade of this invention superimposed upon it in dash lines.

Figure 2 is a sectional view of section b of the Charavay fan blade, corresponding to Figure 4 of Charavay Patent Number 2,157,999.

Figure 3 is a diagrammatic profile of the closest prior known commercial blade which has been designated the V–900 series fan blade.

Figure 4 is a diagrammatic profile of a blade embodying my invention; Figure 4 corresponds to Figure 12 of the drawings scaled down for comparison with Figures 1–3.

Figure 5 is a schematic diagram of a conventional cooling tower arrangement.

Figure 6 is a plan view of a preferred embodiment of the fan blade shown in the position in which it is mounted in the cooling tower.

Figure 7 is a view of the blade of Figure 6 looking from below.

Figure 8 is a chordwise section near the hub end of the blade taken along line 8—8 of Figure 6.

Figure 9 is a chordwise section near the tip end of the blade taken along line 9—9 of Figure 6.

Figure 10 is an elevational view of the tip end of the blade.

Figure 11 is an elevational view of the hub end of the blade including the attachment flange.

Figure 12 is a diagrammatic view of a typical tip end profile section superimposed on a typical root end profile section.

The problems peculiar to a cooling tower, as will be explained more fully hereinafter, arise mainly because of the turbulence in the air drawn through the cooling tower fan and the fact that the eddy currents set up by this turbulence vary considerably with respect to the motion of the fan. In addition, the load of cooling towers varies considerably from summer to winter and, because most cooling towers are operated with nearly synchronous electric motors, the blades are generally reset at least twice a year to accommodate the change in load and in an attempt to get the desired cooling with the lowest possible horsepower. Accordingly the fan should be effective under varying conditions of load and pitch setting, and should also accommodate the entrance of considerably turbulent air.

In considering the prior attempts to solve the above cooling tower problems, the prior known blades or airfoils most pertinent to the present invention are the prior commercial fan blade known as the V–900 series illustrated in Figure 2 and the fan blade disclosed in United States Patent Number 2,157,999 to Frederick Charavay illustrated in Figure 3.

With reference to Figures 2–4, "a" designates the angle included between a plane normal to the axis of rotation of the fan and a tangent to the mean camber arc (the dotted median line between upper and lower surfaces of the blade) at the leading edge. Angle "b" designates the angle of incidence of the blade and is the angle measured between the blade chord and a plane normal to the axis of rotation of the fan. It will be noted that, for identical angles of incidence "b," the angle "a" is positive in the Charavay blade, Figure 2; and negative in the V–900 series blade, Figure 3, and the blade embodying my invention, Figure 4, as will be more fully explained hereinafter. The air flow lines in Figures 2–4 are indicated at F, and stalled air areas are indicated at S in Figures 2 and 3.

The National Advisory Committee for Aeronautics type "a" mean camber arc is shown as a solid line 25 in Fig. 1. An airfoil having a nearly circular mean camber arc such as the NACA type "a" will have nearly uniform pressure distribution and a high lift coefficient. For this reason, the improved fan blade embodied in this invention has been provided with a circular mean camber arc shown by dash line 27, Figs. 1 and 12, which closely approaches the NACA uniform pressure curve. However, the usual airfoil provided with an NACA type "a" mean camber arc is designed with a symmetrical profile, that is, its leading edge is as sharp as its trailing edge. This design yields a highly efficient air foil for any single condition of entering air, but has proved liable to stalling when the entering air is variable as in a conventional cooling tower. The commercial V–900 series blade, the Charavay blade and the present invention for this reason are provided with well rounded leading edges, as shown in Figures 2, 3 and 4, and are more successful in easing the turbulence present in a cooling tower.

However, the V–900 blade, Figure 3, while providing a rounded leading edge did not prove to be a highly efficient design because as I have discovered, the lower curved surface retreated too rapidly to the point where it merged with the upper surface. In other words, the hollow leading portion of the blade which was well under a half of the blade width was too narrow with respect to the overall blade width, causing the curvature of the lower surface to be so great that the streamlined flow of air, indicated by flow lines F, across the lower surface was upset. This in turn caused stalled air areas as indicated at S which lowered the lifting efficiency of the blade.

The Charavay blade, Figure 2, is similar to the V–900 blade in that it too has a leading portion which is about one-third of the blade width. It would appear from this fact, and from the similarity of profiles of the two blades, that as in the V–900 blade the extreme curvature of the lower surface upsets the streamlined flow of air, indicated by flow lines F, across the surface creating stalled air areas as indicated at S and an over-all lowering of lifting efficiency. As shown in said Charavay Patent 2,157,999 the Charavay blade differs from the blade of my present invention in that it is helically twisted, having curved leading and trailing edges with a maximum width near the middle of the blade, whereas my improved blade, as more fully hereinafter set forth, and the V–900 blade have straight leading and trailing edges and maximum blade width at the hub end of the blade. Also, at a given angle of incidence "b" the leading portion of the Charavay blade has a negligible positive or zero angle "a" with the plane of rotation, while at the same angle of incidence my improved blade has a leading portion having a negative angle "a" preferably of from 5 to 12 degrees with the plane of rotation with marked differences in efficiency of operation in a cooling tower. A still further difference is that the Charavay cast blade is limited to 6 foot in diameter fans, while my improved blades are provided for use in fans from 6 to 20 or more feet in diameter.

Cooling tower operation

In conventional cooling tower installations, as illustrated by the schematic diagram of Figure 5, the air which is lifted by the cooling tower fan, generally indicated at 30, enters the tower through louvres 32. This air is drawn through the tower to cool water which in turn acts as the cooling agent for the cooling coils submerged in a conventional opened topped tank containing the water. The water is continuously pumped from the tank into the sprays 34 from which it is sprayed upwardly into the moving air. The tank, coils and water pump are not shown in Figure 5 since they are conventional in design and play no part of this invention.

After the upwardly moving air has mixed with, and cooled the water from sprays 34 the water is intercepted by conventional mist eliminator 35 which serves to separate water from the air, causing it to fall back into the tank and allowing the air to be drawn out of the cooling tower by fan 30.

It will be noted from Figure 5 that a conventional cooling tower is narrowed down as indicated at curve 36 a short distance above the mist eliminators 35. This narrowing of the tower in effect amounts to a Venturi entrance, and because the economics of cooling tower design generally do not admit the use of sufficiently large radius curves in the annulus of the Venturi entrance a vena contracta effect usually results. This effect causes a small amount of recirculation of the air at the hub and tip as shown by the arrows K indicating the direction of the air flow. This recirculation or vena contracta burble at the hub and tip ends of the blade is not due to any defect in the fan blade but rather to the small radius curve 36 at the annulus of the Venturi entrance as pointed out above. Were it practical to increase the radius of this curve 36 the recirculation effect would be largely eliminated.

The arrows K, Figure 5, while they give a general idea of the direction of flow cannot faithfully represent the considerable turbulence in the air leaving the baffles of the mist eliminator 35. These baffles are generally arranged in concentric squares, and the air leaving them, as well as being highly turbulent, presents air at a great diversity of angles relative to the motion of the fan blades 40. Because of this turbulence and the vena contracta effect discussed above, the direction of the air entering fan 30 is variable whereas in conventional axial flow or vortex fans the entrance air is guided.

To efficiently handle the foregoing variable cooling tower conditions, in my fan blade I provide a far smaller change in the angle of incidence of the blade from its hub to its tip end than is general practice in either modern propellers or conventional fans. When the blade incidence angle "b" near the hub end of the blade is high as is normal in a vortex designed fan where the exit air is guided, the air is given a considerable tangential component; and without exit guide vanes any tangential velocity, imparted to the air results in lost energy. In my invention I use a wide planform at the hub end of the blade to promote the desired axial flow of the air despite the fact that its speed is less than that of the tip. The reduction of tangential components, however, is chiefly due to the novel streamlined profile of my fan blade and the fact that a considerably smaller blade angle of incidence "b" is used at the hub than would be normal in the vortex design. This reduction of tangential velocity very considerably reduces the extent of stalled air at the hub end of the blade and likewise reduces the high centrifugal back pressure toward the tip inherent in a vortex designed fan without an exit stator to convert the tangential velocity energy into pressure. Thus, my novel fan blade gives greater efficiency to the fan, and cooling tower as a whole, and has brought about this increase in cooling tower efficiency at less first cost and decidedly less maintenance cost, whereas use of diffuser guide vanes and larger, more streamlined entrance and exit structures would make the cost prohibitive.

*Fan blade design*

My improved fan 30, Figure 5, is comprised of a hub 37 secured on a shaft 38, fan blade supports or shafts 39 which are secured to hub 37 and shaft 38 and the fan blades 40 rigidly secured to the blade supports 39. Shaft 38 is turned by a conventional synchronous electric motor, not shown, and supports 39 are partially rotatable within their fastenings so that the pitch of the fan blades may be adjusted seasonally if necessary.

It must be understood that in order to lift the air, blades 40 are mounted on the fan in a position exactly opposite the normal position of an airplane wing, that is, the convex surface of Figure 7 of the drawings faces down the cooling tower while the partly convex, partly concave surface of Figure 6 faces upwardly. However, in order to avoid confusion in terminology the usual designations will be used throughout the specification so that the Figure 7 surface 42 will be referred to as the upper surface while the Figure 6 surface 44 will be referred to as the lower surface. In other words, for the purposes of terminology, the fan blades 40 will be referred to in the same way as any conventional air foil even though in this particular application the air foil is inverted from the normal position of a conventional air foil.

Accordingly the angle "a" of the present invention is referred to as negative because, with the blade in the position shown in Figure 4, the angle is negative by the conventions of geometrical designation. When the blade is in the inverted position assumed when installed in the cooling tower, angle "a" would be positive by geometrical terminology but, this has no bearing on the aerodynamic aspect of the blade. The angle is still considered negative because it is deflected toward the pressure side of the profile.

The novel fan blades of this invention are provided for use in fans of 6 to 20 or more feet in diameter. As explained above, these blades are mounted in an upside down position in the cooling tower and are so constructed that the leading portion of the blades makes a negative angle of preferably from between 5 and 12 degrees with a plane perpendicular to the axis of rotation of the fan, depending on the pitch setting of the blade. This negative angle "a" of the leading portion is important since it enables the fan to propel a large flow of air at low horsepower in spite of the turbulent air conditions in a cooling tower. It is also important to note that the angle of incidence "b" of the blade with the plane of rotation of the fan is gradually decreased from hub to tip as will be explained more fully hereinafter.

Referring now to Figure 12, this figure is a diagrammatic representation of the tip end profile having its leading edge at point C and its trailing edge at point B (see Figures 6 and 7) superimposed on the hub end profile having its leading edge at D (coincident with point C) and its trailing edge at point A, also found in Figures 6 and 7. Points E, G, H, I and J on the diagram, Figure 12, represent points spaced along the tapered trailing edge as shown in Figure 6. Since the leading edge is a straight line perpendicular to the plane of Figure 12, all points on the leading edge would coincide with points D and C.

Still referring to Figure 12, the line 45 indicates the chord line of the hub end profile while 52 indicates the chord line of the tip end profile. The upper surface of the blade is represented by line 42 and the lower surface by line 44, while T designates the point where the upper and lower surfaces merge to form a solid trailing portion.

The mean camber arc 27 of the applicant's blade is nearly circular so that the resultant upper surface 42 will have constant pressure distribution over its entire area. This fact is important since constant pressure distribution over the surface 42 not only materially increases the design lift coefficient of the blade but eliminates possible stalled air areas at this surface which are present at the upper surfaces of the blades of the prior art as indicated at S in Figure 2. Upper surface 42 is an unwarped arcuate surface comprising a portion of the surface which is generated by a straight line normal to the plane of the root or hub end profile of Figure 12 moving along the upper camber line $AT_1D$ of the profile.

The lower blade surface 44, Figures 6, 8, 9 and 12, is a reverse curved surface comprising a convex portion adjacent the leading edge of the blade which blends into an intermediate substantially planar, inclined portion 47 between points X and Y (Figure 12) which, in turn merges into a concave transition portion 48 at approximately 50% of the root chord line. As in the upper surface, lower surface 44 may be considered as a portion of the surface generated by a straight line normal to the plane of the root end profile of Figure 12 moving along the lower camber line $AT_1XYD$. As pointed out hereinbefore, lower surface 44 is convex at the leading portion of the blade in order to give the blade a well rounded leading edge which has been found to be more efficient than a sharp leading edge in easing the turbulence in the entering air of a cooling tower.

The concave transition portion 48 of lower surface 44 merges with upper surface 42 along a line of tangency parallel to the leading edge and indicated in the drawing (see Figure 7) by the broken line extending from point $T_1$ at the root end of the blade to point $T_2$ at the tip end. The upper and lower surfaces define a hollow leading portion forwardly of the line of tangency $T_1$—$T_2$ and the merged upper and lower surfaces define a thin, solid trailing edge portion extending from the line of tangency to the trailing edge 50. The point of tangency in any profile section of the blade is located at a point well over one-half the distance from the leading edge of the blade to the trailing edge, measured along the chord line of the profile, i. e., tangency occurs at a point in excess of 50% chord. In the blade of the 14 foot fan assembly, for example, the point of tangency is at 61.9% of the hub chord and at 78% of the tip chord. Since the chord length decreases at a constant rate from hub to tip of the blade, the decrease being effected by shortening of the chord length of the solid trailing portion as will be more fully explained hereinafter, the hollow leading portion of the blade is of substantially uniform cross section throughout the length of the blade. The fact that this hollow leading portion extends back well over one-half the chord length is of very great importance in my fan blade, since it is the increase and drawing out of this hollow leading portion which gives the blade a more streamlined and better aerodynamic profile than the blades of the prior art, and thereby eliminates the stalled air areas present in the earlier blades. As pointed out hereinbefore, and as may be seen from Figures 2 and 3, the fact that the hollow leading portions of the earlier fan blades only extend for about one-third of blade chord causes the lower surfaces to curve too sharply back to the point of tangency with the upper surface. This in turn causes the stalled air areas S as shown, since the air moving rapidly across this surface is unable to adjust itself to follow the sharply curved lower surface. In the disclosed embodiment of my invention the ratio of hollow leading portion to the thin solid trailing portion is roughly two-thirds to one-third of the average chord which yields the aerodynamically streamlined profile shown in the drawings.

As may be best seen from Figures 8, 9 and 12, the increased chordwise extent of the hollow leading portion of my improved blade and the flat portion 47 between the convex and concave portions of lower surface 44 enables insertion of blade support 39 with only a very small bump 49 in lower surface 44 to accommodate the support. In the earlier commercial V–900 series blades, Figure 3, the leading portion of the blade tapered back to a thin trailing edge so sharply that a considerably larger bump in the lower surface was necessary to accommodate the blade support and this larger bump was an additional factor in causing stalled air areas. In my improved design the bump 49 is so small that the smooth flow of the air across surface 44 is not substantially upset and stalled air areas are not created.

To obtain the desired decrease in blade incidence angle "b" from the hub to the tip end of the blade without warping or helically twisting the blade, the trailing edge 50 of my improved blade is tapered from its hub to tip end, Figures 6 and 7. Thus, as clearly appears in Figures 7 and 12, the trailing portion, at the hub end, extends from point $T_1$ to A and, at the tip end, from $T_2$ to B, the trailing edge 50 passing through points A, E, G, H, I, J and B. Since upper surface 42 is of uniform curvature from one end to the other and is not twisted or warped, this taper along trailing edge 50 results in decreasing chord lines from hub to tip. These chords are angularly displaced from hub to tip as may be best seen from Figure 12 in connection with Figures 6, 7, 8 and 9 wherein the angular displacement between the hub chord 45 connecting points A and D and the tip chord 52 connecting point B and C is clearly shown. Since, by definition, the angle of incidence of the blade is the angle measured between the plane perpendicular to the axis of rotation and the chord line it will be understood that a gradually decreasing blade angle of incidence from the hub to the tip end of the blade is obtained.

In its disclosed form the preferred construction of the fan blade is fabricated of stainless steel, requiring very little servicing. The blade support 39 on which the blade is mounted is secured to the fan shaft 38 by means of a collar 54, Figures 6, 7 and 11, which is bolted to a suitable casting, indicated diagrammatically at 37, in Figure 5, fixed on the end of shaft 38. Support 39 extends into the blade for a distance of approximately one third the total length of the blade. In assembling the blade, an inner structural member 55 is spot welded at its flanges 56 to the channel sides 57 of channel girder 58, Figure 8. The channel 59 of channel girder 58 is formed at its hub ends so that the channel bottom is rounded to conform to the periphery of blade support 39, and this round bottom portion extends for a distance equal to the length of the structure member 55 which is the distance support 39 extends into the blade. Beyond the round bottom portion of channel 59 into which support 39 must extend, the channel bottom is flattened out as shown at 60, Figure 9, so that lower surface 44 which is adjacent to the channel bottom, Figure 6, is bumped only where it abuts the rounded portion of the channel.

The blade support 39 is inserted into the rounded opening formed for it by structure member 55 and channel girder 58 for a distance equal to the length of member 55 and riveted in place by blind rivets, not shown. Following this step, support 39, member 55 and channel girder 58 are secured to upper surface 42 by spot welding the flanges 63 of channel girder 58 to the under side of upper surface 42, as illustrated in Figures 8 and 9. Flanges 63 are curved in a manner to closely conform with the curvature of surface 42. In addition to spot welding upper surface 42 to the flanges 63 of channel girder 58, the surface 42 is also riveted by blind rivet 64 to member 55 and blade support 39, Figures 7 and 8.

When the support 39, member 55, channel girder 58 and upper surface 42 have been rigidly assembled as shown in Figure 8 the lower surface 44 is spot welded and riveted to the assembly to complete the blade. As best illustrated in Figure 6, the edges of lower surface 44 and upper surface 42 are spot welded together except at the opening for blade support 39 and at drainage holes 65. The trailing portions of these surfaces are also welded together as shown at 66 in Figures 6 and 7 to form the thin solid trailing portion of the blade. Lower surface 44 is further secured to the channel girder 58 and blade support 39 by blind rivets 67 and to the channel girder only with blind rivets 68, Figures 8 and 10. Chordwise ribs 69 are formed in the lower surface 44 in order to add structural strength to the blade. Additional details of construction are fully disclosed in copending application Serial No. 139,375 filed on January 19, 1950 for "Fan Blade Construction."

It will be understood from the foregoing description that this invention provides an efficient solution to the long standing problems connected with the operation of a conventional cooling tower. By means of a novel design and construction, light weight fan blades are provided which may be fabricated into large diameter fans without excessive weight support or power requirements and which have a higher lift coefficient at lower horsepower than the blades of the prior art. My new streamlined and aerodynamically efficient blade profile has eliminated stalled air areas and increased air moving capacity while the fabricated steel construction adapted to the difficult forming requirements of stainless steel provides a lighter corrosion resistant blade which may be driven with low horsepower and requires minimum field service and replacement. Thus, not only is the fan efficiency increased but the efficiency of the cooling tower as a whole raised by this novel fan blade.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A cambered fan blade having a leading portion and a trailing portion, said leading portion tapering rearwardly in chordwise cross-section, merging smoothly into said trailing portion, and being uniform in chordwise cross-section throughout the span of the blade and varying in thickness in the chordwise direction, said trailing portion being of constant thickness and having the chordwise dimension decreasing in spanwise direction from the root to the tip of the blade.

2. A fan blade as defined in claim 1 wherein the mean camber line of the chordwise cross-section is substantially a circular segment.

3. A fan blade as defined in claim 1 wherein said leading portion constitutes more than one-half of the chordwise width of the blade.

4. A cambered fan blade having a leading portion and a trailing portion, said leading portion having a thickened profile uniform throughout its length and tapering and merging smoothly into said trailing portion, said trailing portion being of substantially constant thickness throughout and having a decreasing chordwise dimension from hub to tip.

5. A fan blade as defined in claim 4 having a circular mean camber arc, a continuously convex surface on the low pressure side, a compound convexo-concave surface on the high pressure side and wherein the leading portion constitutes more than one-half the chordwise width of the blade.

References Cited in the file of this patent

UNITED STATES PATENTS

| Number | Name | Date |
|---|---|---|
| 1,044,064 | Lorenzen | Nov. 12, 1912 |
| 1,313,599 | Ingells | Aug. 19, 1919 |
| 2,157,999 | Charavay | May 9, 1939 |
| 2,214,339 | McKee | Sept. 10, 1940 |
| 2,342,421 | Moore | Feb. 22, 1944 |
| 2,362,301 | Pecker | Nov. 7, 1944 |
| 2,364,635 | Hasler | Dec. 12, 1944 |
| 2,396,811 | Bathras | Mar. 19, 1946 |
| 2,450,440 | Mills | Oct. 5, 1948 |
| 2,457,889 | Gruetjen | Jan. 4, 1949 |
| 2,460,351 | Hoffman et al. | Feb. 1, 1949 |
| 2,468,723 | Bartlett | Apr. 26, 1949 |
| 2,477,113 | Campbell | July 26, 1949 |

FOREIGN PATENTS

| Number | Country | Date |
|---|---|---|
| 147,971 | Great Britain | July 12, 1920 |
| 361,799 | Great Britain | Nov. 26, 1931 |

OTHER REFERENCES

Aerodynamics of the Airplane, by C. B. Millikan, 1941, John Wiley & Sons, Inc., New York (pages 66–72 cited).

Baughman's Aviation Dictionary and Reference Guide, 1st edition, fourth printing, 1940, Aero Publishers, Inc., Glendale, Calif., page 27 cited.